Patented Apr. 28, 1942

2,281,316

UNITED STATES PATENT OFFICE 2,281,316

COMPOSITION OF MATTER AND METHOD OF PRODUCING THE SAME

Everitt Walter Mace, Tulsa, Okla., assignor to Petrolite Corporation, Ltd., Wilmington, Del.

No Drawing. Application January 22, 1940, Serial No. 315,127

16 Claims. (Cl. 260—406)

This invention relates to new chemical compounds or compositions of matter having particular utility in such arts as resolution of crude oil emulsions, plasticization of materials such as derivatives of cellulose or various synthetic resins, and the like, as well as in the manufacture of certain polishes, such as furniture polishes, which usually employ materials of the kind exemplified by blown castor oil. Other objects and features of the invention will become more apparent in the subsequent detailed description.

In general, my invention is based upon the discovery that if acetals of hydroxy fatty acid bodies, particularly castor oil or ricinoleic acid, are blown or drastically oxidized by means of a gaseous oxidizing medium, one obtains a new composition of matter or a chemical compound or a mixture of chemical compounds having properties which make such materials particularly desirable in various arts, such as those previously indicated. The fact that acetals can be produced from unsaturated fatty acids, particularly unsaturated hydroxy acids, is well known. I have found that if the unsaturated hydroxylated fatty acids or their simple derivatives, such as the esters, are treated with acetal-forming compounds, one obtains a product which is susceptible to drastic oxidation by a gaseous medium, such as air, ozone, and the like. The process of gaseous oxidation is well known; and as a unit process it is of the same type as that which is employed in producing blown castor oil from ordinary castor oil of commerce, or in the manufacture of similar products.

As to the manufacture of acetals of ricinoleic acid, castor oil, diricinoleic acid, polyricinoleic acid, and the like, reference is made to the process described in detail in German Patent No. 226,222, dated September 27, 1910, to Farbwerke vorm. Meister Lucius & Bruning in Hochst a. M. I have found that an acetal type product of hydroxylated unsaturated fatty acids, as exemplified by ricinoleic acid, is susceptible to gaseous oxidation with the production of a resultant product of desirable characteristics. Attention is directed to the various aldehydes indicated in said aforementioned patent as being suitable for use in the process therein described. I have found that the lower molecular weight aldehydes, such as formaldehyde, acetaldehyde, butyraldehyde, and the like, to be most desirable. One may of course employ hydroxyaldehydes, such as aldol or cyclic aldehyde, such as benzaldehyde, furfuraldehyde, etc. Generally speaking, my preference is to use formaldehyde. Furthermore, it is known that ketones, particularly the simpler ketones, such as acetone, ethyl methyl ketone, diethyl ketone, and the like, will also produce acetals, but with lower yields and slower reaction velocity than aldehydes. Thus, although ketones, particularly acetone, may be employed, it is decidedly more advantageous to use an aldehyde, particularly formaldehyde.

*Acetal-type product Example 1*

A kilogram of ricinoleic acid is treated with 250–500 grams of 40% formaldehyde solution, adding the formaldehyde solution little by little at 20° C., and stirring while the addition takes place. When all the aldehyde solution is added, the mixture is saturated with hydrochloric acid gas. The saturated mass is stirred for approximately 24–48 hours, adding additional hydrochloric acid gas so that a maximum amount is present at all times. At the end of this reaction period, the reaction product is stirred with an equal volume of a solution of sodium sulfate of approximately 10% strength. The mixture is allowed to separate and the aqueous portion withdrawn. The acetal product is then given two subsequent washes with hot water so as to remove all or substantially all traces of hydrochloric acid. The product is then heated to a temperature of about 70° C. and dried carbon dioxide gas passed through to remove any remaining traces of hydrochloric acid, as well as any moisture which may be present. The product thus obtained may be conveniently designated as an acetal of ricinoleic acid.

*Acetal-type product Example 2*

Castor oil is substituted for ricinoleic acid in the previous example. Needless to say, in the presence of hydrochloric acid, at least part of the oil is decomposed into ricinoleic acid or polyricinoleic acid. Possibly during the hydrolytic step, monoricinolein or diricinolein is also formed. Furtherfore, it may be that the glycerol liberated forms of an acetal-type complex product with one or more of the previously indicated ricinoleic acid bodies and the reactant, formaldehyde.

*Acetal-type product Example 3*

Acetone is substituted for formaldehyde in Example 1.

*Acetal-type product Example 4*

Acetone is substituted for formaldehyde in Example 2.

It will be noted that the products of the kind previously described have been referred to as acetals or acetal-type. A study of the reaction involving formaldehyde and ricinoleic acid under conditions described indicates that the alcoholic hydroxyl disappears to a greater or lesser degree, and apparently the product formed is an acetal, which may be indicated in a general way by the following formula:

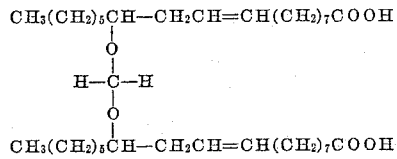

The central methylene radical naturally is a residual radical derived from formaldehyde; and in event some other aldehyde would be employed, the residual radical would be

in which R represents the hydrocarbon or hydroxy hydrocarbon radical derived from the aldehyde employed, such as acetaldehyde, aldol, crotonaldehyde, etc. Similarly, if a ketone would be employed, the central radical would appear thus:

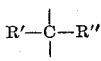

in which R' and R" represent radicals derived from the ketone employed, such as methyl radicals, ethyl radicals, etc.

However, it is probable that even when one starts with ricinoleic acid, actually the dibasic acid produced by the formation of the acetal combines with the unreacted hydroxy acid, such as ricinoleic acid, and that actually one might build up a more complex structure than the simple one indicated above. Furthermore, reference to the aforementioned German patent reveals the fact that such procedure, i. e., the reaction with an aldehyde, such as formaldehyde, in presence of a strong mineral acid, such as hydrochloric acid, or sulfuric acid, may take place with an ordinary unsaturated fatty acid, such as oleic acid. Without attempting to point out hypothetical reactions by which such reactions can take place, it is sufficient to indicate that if one assumes a hypothetical hydration of oleic acid, it simply means a conversion into hydroxystearic acid; and naturally in view of what has been said previously, a saturated hydroxy acid would react to form an acetal just as readily as an unsaturated hydroxy fatty acid; but the resultant product so derived from a saturated hydroxy acid apparently is not susceptible to drastic gaseous oxidation of the type hereinafter described. However, a consideration of what has just been said indicates that one cannot rule out the possibility that some further complex reactions may take place in the reaction of ricinoleic acid with acetal-forming compounds, for example, in such a manner as to involve the ethylene linkage. For these reasons, it is obvious that one cannot indicate the exact nature of the chemical compounds or compositions of matter obtained and that one must describe them in terms of the method of manufacture. Thus, the most convenient terminology is that usually employed, to wit, to refer to the products as acetals or reaction products of the acetal type. To indicate those obtained by means of aldehydes, they will be referred to as acetals of aldehydes; and those obtained by means of ketones will be referred to as ketone acetals. Because of the exact nature of the final reaction product is not known, more properly the compositions can be designated as the reaction product of unsaturated hydroxy fatty acid bodies of high molecular weight with ketones or aldehydes, which are acetal-forming compounds containing a reactive carbonyl group.

Having obtained the reaction products of the acetal type in the manner indicated, the next step is to subject to oxidation in the manner commonly employed in the manufacture of blown ricinoleic acid, blown castor oil, and the like. However, this difference is to be noted: Actually compounds of the kind above described react much more rapidly than the comparable non-acetalized materials, such as ricinoleic acid, castor oil, and the like. Thus, the time of oxidation or blowing is roughly one fifth to one tenth the time that would be required for converting the comparable amount of ricinoleic acid or castor oil to the same state of oxidation under the same conditions of operation. Since blown ricinoleic acid, blown castor oil, and the like, are well known commercial products, and since the methods of producing the same are well known, it does not appear necessary to refer to such procedure except in the briefest detail.

It is common practice to blow or oxidize castor oil and similar fatty oils or acids, particularly non-drying unsaturated fatty acids, by means of a gaseous oxidizing medium, such as air, oxygen, ozone, or ozonized air. The gaseous medium, such as air, may be moist or dry, and the oxidation may take place in the presence or absence of a catalyst. The catalyst may be of a metallic type, such as lead ricinoleate, cobalt ricinoleate, manganese ricinoleate, etc.; or it may be of the organic type which produces peroxides, such as alpha pinene, linseed oil, etc. Oxidation may take place at atmospheric pressure or superatmospheric pressure; i. e., pressures up to and including 200 pounds gauge pressure; and at a temperature slightly above the boiling point of water, for instance, at 120° C. up to any temperature which does not produce undue decomposition by pyrolytic reaction. The time of blowing may be fairly brief, for example, 8–10 hours; or it may be quite extensive, for instance, as long as 10, 12, or 14 days. The short periods are employed generally at the temperatures in higher permissible ranges and/or superatmospheric pressures; the longer periods are employed generally when the temperature is slightly above the boiling point of water, that is to say, about 105–120° C. and when oxidation is conducted by means of air at atmospheric pressure.

Thus, such procedure is readily adapted to the drastic gaseous oxidation of materials of the kind above described, i. e., acetals of unsaturated hydroxy fatty acids or fatty acid bodies, except that the period of oxidation is greatly reduced. The comparison of treatment lengths is made with the untreated ricinoleic acid or esters thereof and on the basis of like or analogous conditions.

*Oxidized acetal-type fatty acid compounds*

My preferred composition of matter is obtained by subjecting a material such as that derived in the manner described under Example I above, to the action of ordinary undried air at a temperature of about 110–125° C. for approximately 25–50 hours, in the absence of a catalyst, until the product reaches the maximum viscosity which is possible just short of the gelation point. If desired the acidity of the final product may be removed by esterification with an alcohol such as ethyl alcohol, propyl alcohol, ethylene glycol, glycerol, benzyl alcohol or cyclohexanol; or it may be removed with a suitable basic material such as an alkali including ammonia, or an amine such as triethanolamine, benzylamine, cyclohexylamine, amylamine, etc. This final step is obviously of general applicability.

Acetal-type products as exemplified by Example 1 or Example 3 may be esterified in a conventional manner with an alcohol of the kind indicated above prior to oxidation.

Such product as referred to more particularly supra in the example has a very light color and is particularly adapted for use as a plasticizer in the formulation of nitrocellulose or cellulose acetate lacquers and varnishes, and the like. It is particularly suitable for use as a demulsifier in breaking of oil field emulsions and may be used in the same manner in which blown castor oil is ordinarily employed. Generally speaking, however, one is apt to obtain decidedly better results with the composition above described; and in some instances emulsions can be broken or resolved by means of the composition of matter herein contemplated, which cannot be broken or resolved by means of ordinary blown oils, as exemplified by blown castor oil.

It has previously been indicated that it is impossible to characterize properly the unblown acetalized product by means of a chemical formula. As is well known, it is impossible to indicate the composition of blown triricinolein, even when the composition of the raw material involved is known. Of course, chemical characteristics as indicated by various chemical indices, such as saponification value, hydroxyl value, iodine number, etc., are well known in regard to conventional blown oils; but the composition of the actual constituents is not known. Similarly, in the present instance, not knowing the exact composition of the raw material which is subjected to drastic gaseous oxidation, one cannot indicate by chemical formulas the composition of the resultant product. Thus, the product herein contemplated must of necessity be characterized in terms of the method of manufacture for the simple reason that no other suitable means is available.

In summation, my invention may be considered as the production of oxidation products of the acetals of ricinoleic acid, polymerized ricinoleic acid, and esters of the same, particularly those derived from polyhydric alcohols, such as glycerol and various glycols. Esters of monohydric alcohols, such as butyl, amyl or octyl alcohol are also included. It is to be understood that where the term "ester" appears in the claims, it is intended to signify the ester formed by the combination of the carboxyl group or groups of ricinoleic and polyricinoleic acid with alcohols and not alcohol type acids having a residual free COOH group.

What I claim as new and desire to secure by Letters Patent of the United States is:

1. A viscous, non-gelatinized product formed by oxidizing with an oxygen-containing gas the reaction product of a member of the group consisting of ricinoleic acid, polyricinoleic acid and their esters with a member of the group consisting of aldehydes and ketones.

2. A viscous, non-gelatinized product formed by oxidizing with an oxygen-containing gas the reaction product of a member of the group consisting of ricinoleic acid, polyricinoleic acid and their esters with an aldehyde.

3. A viscous, non-gelatinized product formed by oxidizing with an oxygen-containing gas the reaction product of a member of the group consisting of ricinoleic acid, polyricinoleic acid and their esters with formaldehyde.

4. A viscous, non-gelatinized product formed by oxidizing with an oxygen-containing gas the reaction product of castor oil with a member of the group consisting of aldehydes and ketones.

5. A viscous, non-gelatinized product formed by oxidizing with an oxygen-containing gas the reaction product of castor oil with an aldehyde.

6. A viscous, non-gelatinized product formed by oxidizing with an oxygen-containing gas the reaction product of castor oil with formaldehyde.

7. A viscous, non-gelatinized product formed by oxidizing with an oxygen-containing gas the reaction product of castor oil with a ketone.

8. A viscous, non-gelatinized product formed by oxidizing with an oxygen-containing gas the reaction product of castor oil with acetone.

9. A viscous, non-gelatinized product formed by oxidizing with air the reaction product of a member of the group consisting of ricinoleic acid, polyricinoleic acid and their esters with a member of the group consisting of aldehydes and ketones.

10. A viscous, non-gelatinized product formed by oxidizing with an oxygen-containing gas the reaction product of ricinoleic acid with a member of the group consisting of aldehydes and ketones.

11. A viscous, non-gelatinized product formed by oxidizing with an oxygen-containing gas the reaction product of polyricinoleic acid with a member of the group consisting of aldehydes and ketones.

12. In the process of producing an oxidation product, the step of contacting the composition from a member of the group consisting of ricinoleic acid, polyricinoleic acid and their esters, which have been reacted with a member of the group consisting of aldehydes and ketones, with a gaseous oxidizing medium and continuing the oxidation until the product becomes viscous but not gelatinized.

13. In the process of producing an oxidation product, the step of contacting the composition from a member of the group consisting of ricinoleic acid, polyricinoleic acid and their esters, which have been reacted with a member of the group consisting of aldehydes and ketones, with air and continuing the oxidation until the product becomes viscous but not gelatinized.

14. In the process of producing an oxidation product, the step of contacting the composition from a member of the group consisting of ricinoleic acid, polyricinoleic acid and their esters, which have been reacted with a member of the group consisting of aldehydes and ketones, with oxygen and continuing the oxidation until the product becomes viscous but not gelatinized.

15. In the process of producing an oxidation product, the step of contacting the composition from a member of the group consisting of ricinoleic acid, polyricinoleic acid and their esters, which have been reacted with a member of the group consisting of aldehydes and ketones, with ozone and continuing the oxidation until the product becomes viscous but not gelatinized.

16. In the process of producing an oxidation product, the step of contacting the composition from a member of the group consisting of ricinoleic acid, polyricinoleic acid and their esters which has been reacted with a member of the group consisting of aldehydes and ketones with a gaseous oxidizing medium at a temperature in the approximate range of 100° C. up to, but not including the temperature point that produces pyrolytic decomposition of the reacting mass and continuing the gaseous oxidation until the product becomes viscous but not gelatinized.

EVERITT WALTER MACE.